United States Patent
Teisberg et al.

(10) Patent No.: US 8,005,013 B2
(45) Date of Patent: Aug. 23, 2011

(54) MANAGING CONNECTIVITY IN A VIRTUAL NETWORK

(75) Inventors: Robert R. Teisberg, Georgetown, TX (US); Mike H. Chuang, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 11/761,378

(22) Filed: Jun. 12, 2007

(65) Prior Publication Data
US 2008/0310421 A1    Dec. 18, 2008

(51) Int. Cl.
H04L 12/28   (2006.01)
H04L 29/06   (2006.01)
G06F 7/04    (2006.01)
G06F 15/16   (2006.01)
G06F 17/30   (2006.01)
G01R 31/08   (2006.01)
G06F 11/00   (2006.01)
G08C 15/00   (2006.01)
H04J 1/16    (2006.01)
H04J 3/14    (2006.01)
H04L 12/26   (2006.01)

(52) U.S. Cl. .................................. 370/254; 726/10

(58) Field of Classification Search .................. 370/389
See application file for complete search history.

(56) References Cited

U.S. PATENT DOCUMENTS

| | | | |
|---|---|---|---|
| 5,394,402 A * | 2/1995 | Ross | 370/402 |
| 5,684,800 A * | 11/1997 | Dobbins et al. | 370/401 |
| 5,751,967 A * | 5/1998 | Raab et al. | 709/228 |
| 5,914,938 A * | 6/1999 | Brady et al. | 370/254 |
| 6,414,958 B1 * | 7/2002 | Specht | 370/395.53 |
| 7,380,025 B1 * | 5/2008 | Riggins et al. | 710/8 |
| 7,773,096 B2 * | 8/2010 | de Souza et al. | 345/619 |
| 2006/0206602 A1 * | 9/2006 | Hunter et al. | 709/223 |
| 2006/0285693 A1 * | 12/2006 | Raikar | 380/278 |
| 2008/0270588 A1 * | 10/2008 | Sultan et al. | 709/223 |

OTHER PUBLICATIONS

Author Unknown, IEEE 802.1ab Standard, May 5, 2005, pp. 1-172.*
Author Unknown, User Guide for Cisco Campus Manager 4.0, 2005.*
Strings and Pattern Matching, Dec. 17, 2006.*

* cited by examiner

*Primary Examiner* — Daniel J Ryman
*Assistant Examiner* — Christopher Crutchfield

(57) ABSTRACT

Embodiments include methods, apparatus, and systems for managing connectivity in a virtual network. One embodiment determines if information received from a device in a virtual land area network (VLAN) matches a configuration of a virtual connect domain (VCD) in order to label links as being either internal or external.

19 Claims, 7 Drawing Sheets

MANAGING CONNECTIVITY IN A VIRTUAL NETWORK

BACKGROUND

As data centers increase server density, server deployment and management continues to be a resource-intensive task. For example, a server administrator typically must log on to each server and individually configure each server for communicating on the network. The configuration of the servers and attached network devices (switches, bridges, and routers) must be carefully coordinated to ensure reliable and secure operation. This configuration is manually performed by a server administrator. Accordingly, administrating servers and network devices in data centers can be inefficient, time-consuming, costly, and potentially error-prone.

Attempts have been made to automate network and server management. Some systems use a layer of management software that controls both servers and network devices by interacting with their respective management interfaces. The difficulty of automatically managing a collection of servers and network devices from a variety of vendors is only partially mitigated by the availability of standard management protocols such as SNMP (Simple Network Management Protocol).

End-node-based techniques exist for monitoring aspects of network health and topology of interest to end nodes. These techniques are mildly intrusive to the end nodes and require some knowledge of the network configuration on the part of the end node administrator to be used effectively.

DETAILED DESCRIPTION

Figure 1:
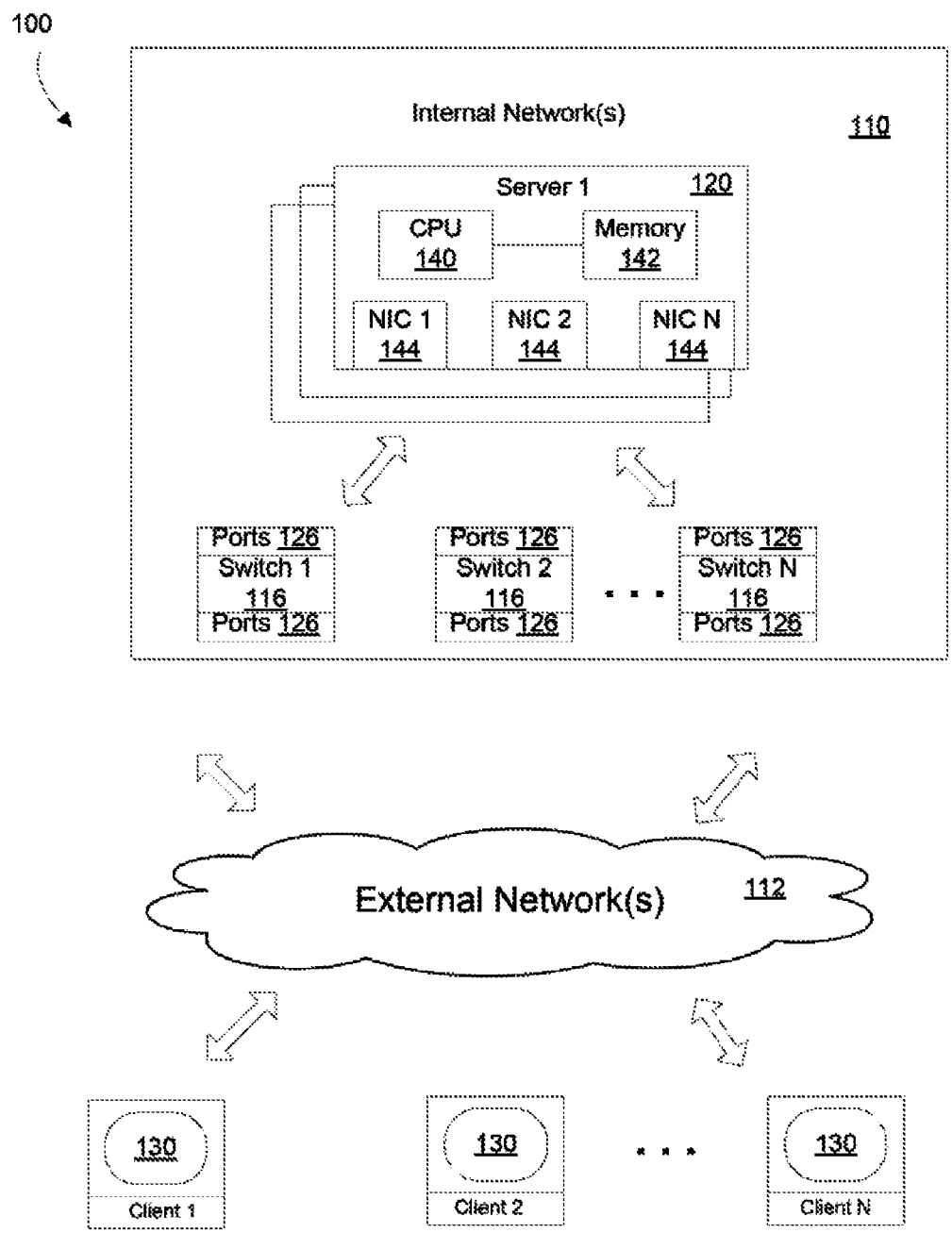
FIG. 1 is a block diagram of an exemplary networked computer system in accordance with an exemplary embodiment of the present invention.

Embodiments are directed to apparatus, systems, and methods for discovering, routing, and managing devices for server and network visualization.

In one embodiment, a hidden network exists between a collection of end nodes and a collection of external networks. To the external networks, the hidden network emulates a collection of network ports on the end nodes, and to the end nodes it provides a corresponding set of network connections. The hidden network maintains the connections between end nodes and external networks and transparently adapts as configurations and topologies change. By discovering the identities and monitoring the attached network equipment, the hidden network adapts to changes in cabling topology or network configuration without requiring changes to end node configuration. By discovering the identities and monitoring the state of the attached end nodes, the hidden network adapts to changes in end node configuration or location without requiring changes to network configuration. The hidden network adapts automatically to changes in the configuration and topology of its own elements (switches, bridges, links, etc.) without administrative action by a user.

Embodiments enable network administrators to manage network capacity, configuration, fault recovery, etc., without the necessity to coordinate with end node administrators. Embodiments also enable server administrators to manage end node capacity, configuration, fault recovery, etc., without the necessity to coordinate with network administrators.

Exemplary embodiments maintain efficient, reliable connectivity between end nodes and the external networks independently of the operating software on the end nodes. Embodiments also support mutual isolation of end nodes that do not interact with one another. To the external network and to the end nodes, embodiments are invisible. For instance, it appears to the network as a collection of end nodes and to the end nodes as a collection of networks. At the same time, exemplary embodiments introduce no vulnerabilities and impose no requirements for special configurations or protocols. In particular, it neither requires nor interferes with the use of STP on the network.

In one exemplary embodiment, topology management protocols (such as rapid spanning tree protocol, RSTP) within the hidden network are confined to the hidden network and not seen by the external network. The hidden network components do not need to participate in the topology management protocols of the external network because bridges between external network ports do not exist. As such, loops in the external network are not created.

The hidden network maintains an arbitrarily large collection of virtual networks. For instance, one embodiment uses IEEE 802.1Q VLAN technology for this purpose, but other protocols with similar characteristics would work as well. By administratively assigning specific ports to specific virtual networks, the hidden network effectively isolates the virtual networks from one another. The virtual networks terminate at the boundaries of the hidden network, where they are mapped to physical ports or to virtual networks independently defined in the external network.

The components of the hidden network use a discovery protocol to discover the boundaries of the hidden network. For instance, one embodiment uses standard IEEE 802.3ad link layer discovery protocol (LLDP) but other protocols with similar characteristics would work as well.

When components capable of participating in the hidden network discover each other, they activate certain LLDP extensions that enable them to learn the internal topology of the hidden network.

These extensions include encryption-based authentication to prevent unauthorized devices from participating in the hidden network. At the boundary to the external networks, the hidden network monitors traffic to identify collections of ports connected to the same external network. This monitoring includes both passive techniques, such as observing and comparing IEEE 802.1D BPDUs (bridge protocol data units), and active techniques, such as periodically exchanging frames with one another across the external network.

The hidden network greatly reduces need to coordinate management activity between end node and network administrators. This enables end node administrators to manage availability and capacity in the context of a stable network configuration. Network administrators do not need to configure ports for new servers at the time of need, which is time-consuming and error-prone. Network administrators also do not need to pre-provision ports for use by possible future servers, which is wasteful. On the network side, administrators can add or remove bandwidth at the boundary between the hidden network and the external network, and the hidden network adapts to changes transparently to the end nodes.

FIG. 1 is a block diagram of an exemplary networked computer system 100 in accordance with an exemplary embodiment of the present invention. The computer system includes one or more internal communication networks 110 (such as local area network, LANs and/or virtual LANs) coupled to one or more external networks 112 (such as a wide area network, WAN). The internal networks 110 also include one or more network devices 116 (shown as switch 1 to switch N) and one or more host devices 120 (shown as plural servers).

Each network device 116 includes one or more ports 126 for providing communication links between hosts 120 and resources available in the internal network 110 and external network 112 (example, client computers 130). In one embodiment, the network devices 116 establish, maintain, and/or transfer data communications in the networked computer system 100. Exemplary network devices include, but are not limited to, Ethernet and Fibre Channel switches, routers, hubs, and other devices capable of transmitting and/or routing data packets.

Each host device 120 includes a CPU 140, memory 142, and one or more network interface cards 144 (NICs, shown as NIC 1 to NIC N). In one embodiment, the hosts include computers, servers, and/or blades. As used herein, a "blade" is a standardized electronic computing module that is plugged in or connected to a computer or storage system. A blade enclosure provides various services, such as power, cooling, networking, various interconnects and management service, etc for blades within an enclosure. Together the individual blades form a blade system. The enclosure (or chassis) performs many of the non-core computing services found in most computers. Further, many services are provided by the enclosure and shared with the individual blades to make the system more efficient. The specifics of which services are provided vary by vendor.

In one embodiment, the hosts 120 apply virtual NIC configurations by grouping Ethernet ports together and defining virtual interlaces to the grouping. These configurations are achieved in an operating system (OS) specific manner by each host OS. For example, a system administrator loads the configuration onto the host. Standard protocols for this purpose include, but are not limited to, SMASH/CLP (system management architecture for server hardware and command line protocol) and SNMP (Simple Network Management Protocol). Web-based management or a proprietary management interfaces are also appropriate.

The NICs 144 may be any type of network adapter and can be grouped into one or more teams, each team functioning as a single "virtual" NIC. Packets sent by NICs 144 comprise, among other features, a source media access control (MAC) and IP address (indicating the originating node of the packet), and a destination MAC and IP address (indicating the desired destination of the packet). Each virtual NIC can be assigned a single MAC and IP address. Packets that are sent by the virtual NIC comprise the assigned MAC and IP address as the source MAC and IP address of the packet, regardless of which NIC actually sends the packet. Packets with the assigned MAC and IP address of the virtual NIC are received by any NIC in the team.

Figure 2A:
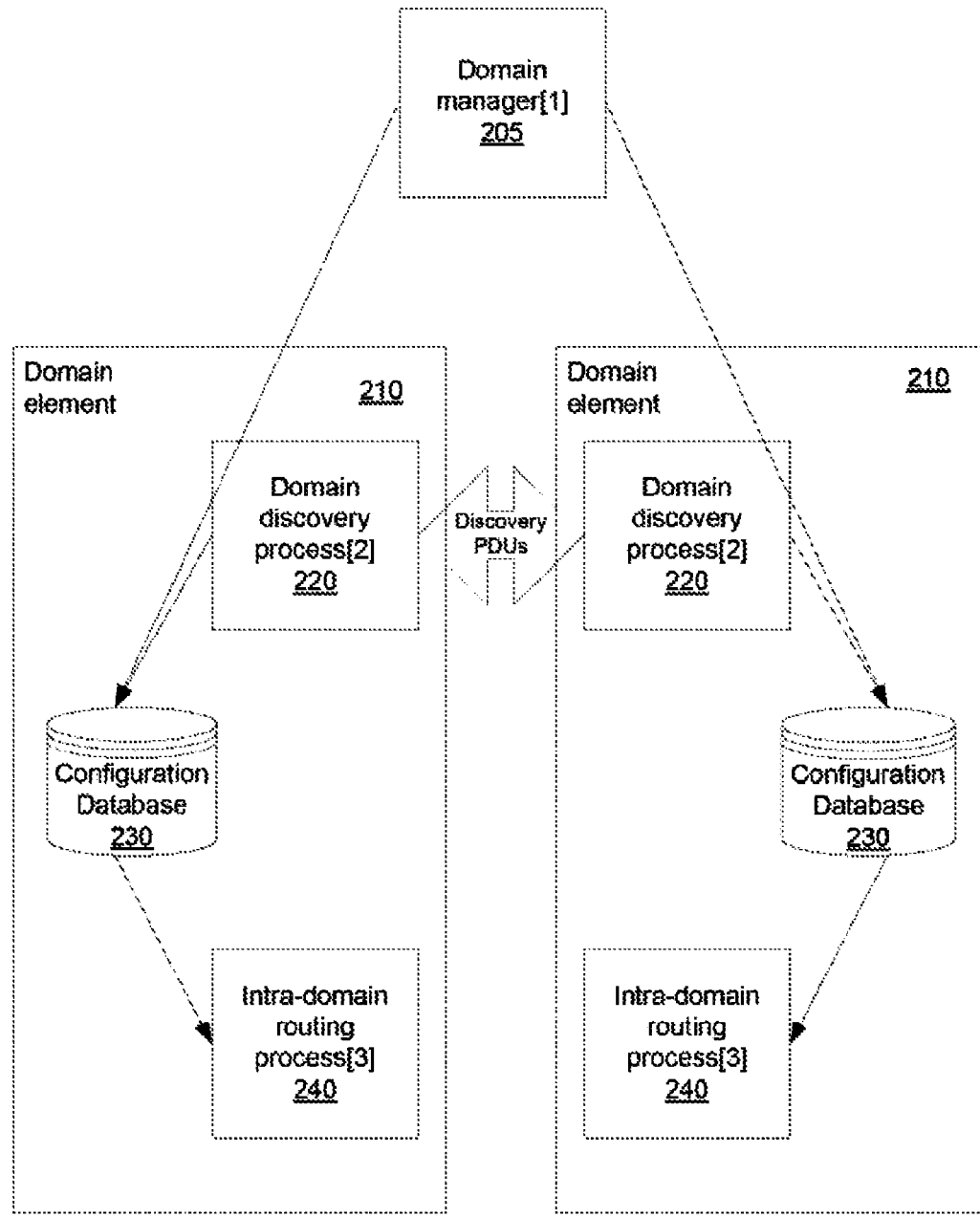
FIG. 2A is a block diagram of a system for discovering and identifying links in accordance with an exemplary embodiment of the present invention.

FIG. 2A is a block diagram of a system 200 for discovering and identifying links. The system includes a domain manager 205 and two or more domain elements 210. Each domain element includes a domain discovery process 220, a configuration database 230, and an intra-domain routing process 240.

Initially, the domain manager 205 establishes domain configurations and propagates these configurations to all domain elements 210 in the domain. Next, the domain discovery process 220 detects other domain elements in the domain and records in the configuration database 230 the specific ports to which they are attached.

The intra-domain routing process 240 is notified of changes to the configuration database 230. From the domain configuration supplied by the domain manager, the intra-domain routing process 240 calculates the preferred set of uplink ports for each network and the full set of downlink ports to which servers participating in each network are attached. From the domain membership information supplied by the domain discovery process, the intra-domain routing process 240 determines which links are candidates for carrying data for each configured network and further identifies uplinks to the datacenter network which it does not include it its spanning tree calculation. These data are inputs to the routing calculation (in one embodiment, a variant of Spanning Tree Protocol called Multiple VLAN Spanning free (MVST) is used). By adjusting costs to correspond to the available bandwidth of uplinks to the network, the intra-domain routing process 240 biases the root node selection process to optimize efficient traversal of the domain.

Figure 2B:
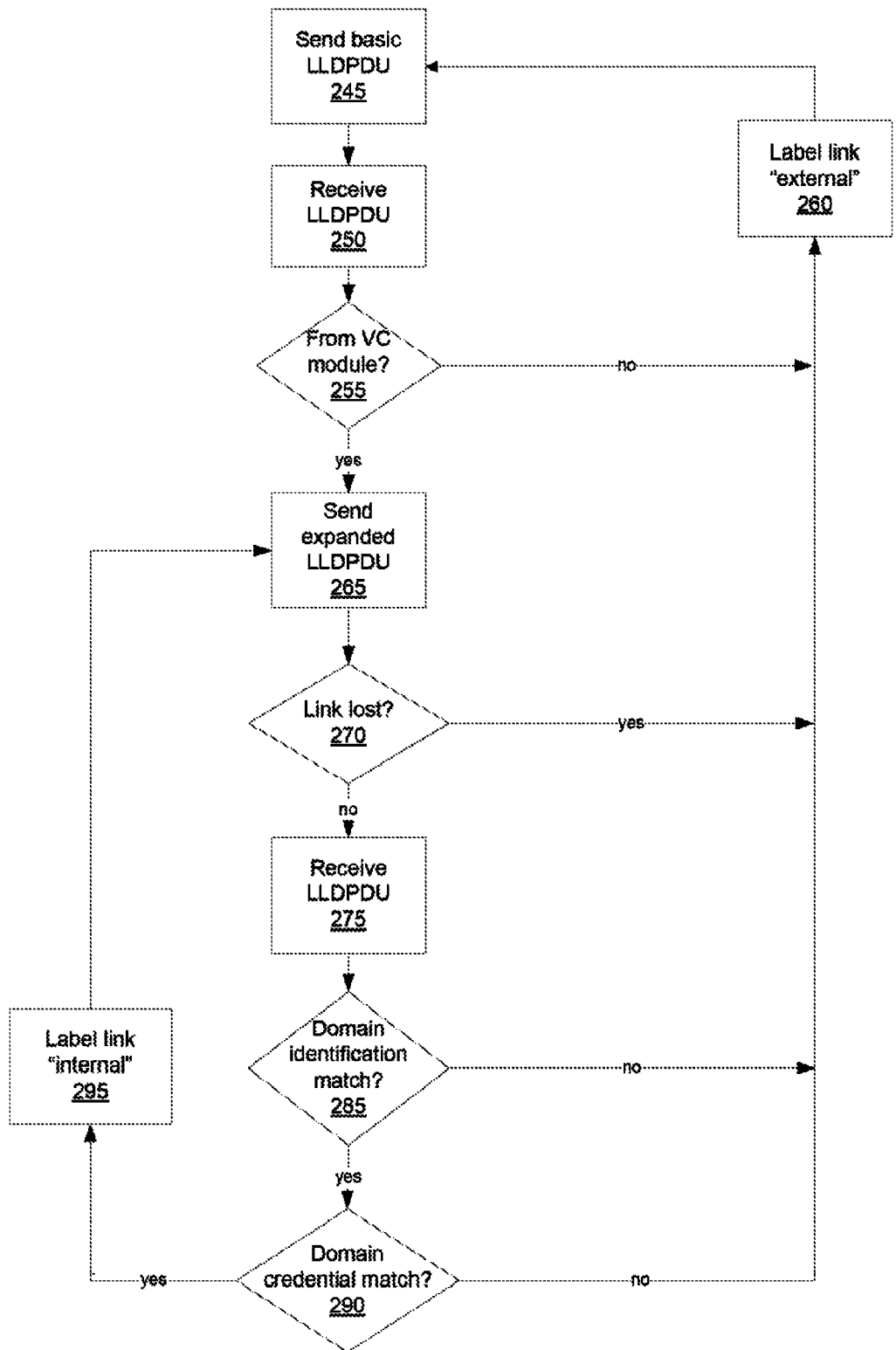
FIG. 2B is a flow diagram for discovering and identifying links in accordance with an exemplary embodiment of the present invention.

FIG. 2B is a flow diagram for discovering and identifying links. According to block 245, basic LLDPDU (link layer discovery protocol data units) are sent. LLDP is a vendor neutral layer 2 protocol implemented by a device attached to a specific LAN segment to advertise its identity and capabilities and to also receive identities and capabilities from a physically adjacent layer 2 peer. LLDPDUs are sent to the destination MAC address that is defined as the "LLDP_Multicast" address. This address is defined within a range of addresses reserved by the IEEE for protocols that are to be constrained to an individual LAN. Link layer discovery allows the domain manager to model the topology of the network by interrogating the MIB (management information base) databases in the devices. The basic LLDPDU contains an OSTLV (operating system type-length-value) identifying the sender as a virtual connect (VC) module. In the embodiment, this OSTLV is a Virtual Connect Protocol Version TLV.

Virtual Connect is a set of interconnect modules and embedded software for a blade enclosure that simplifies the setup and administration of server connections. While Virtual Connect uses the standard NICs within the server, it also uses a class of Ethernet interconnect modules to simplify connection of those server NICs to a datacenter environment. VC also extends the capability of the standard server NICs by providing support for securely administering their Ethernet MAC address and enables an administrator to interconnect multiple modules (and enclosures), define uplinks to their datacenter Ethernet switches, and then allow the administrator to select which server NIC ports will be connected to each external network. Looking in to the enclosure from each external Ethernet network, only the selected Ethernet NIC ports will be visible on what appears to be an isolated, private, loop-free network.

According to block 250, the LLDPDU is received. Then at block 255, a determination is made as to whether the LLD- PDU is from a VC module. If the LLDPDU is not from a VC module, then flow proceeds to block 260. Here, the link is labeled as being "external" since it is not from a VC module.

If the LLDPDU is from a VC module, then flow proceeds to block 265. Here, the expanded LLDPDU is sent. An expanded LLDPDU contains additional OSTLVs identifying the domain of the sender and the specific identity.

According to block 270, a determination is made as to whether the link is lost. If the link is lost, then flow proceeds to block 260 wherein the link is labeled as "external." If the link is not lost, then flow proceeds to block 275 wherein the LLDPDU is received.

According to block 285, a determination is made as to whether a match exists with the domain identification. If the domain identification does not match, then flow proceeds to block 260 wherein the link is labeled as "external." If the domain does match, then flow proceeds to block 290. Here, a determination is made as to whether the domain credential matches. If the domain credential does not match, the flow proceeds to block 260 wherein the link is labeled as "external." If the domain credential does match, then flow proceeds to block 295 wherein the link is labeled as "internal." In one embodiment, the domain credential is a shared secret that is combined with element-specific information to generate a hash. The hash is included in the expanded LLDPDU.

Figure 3:
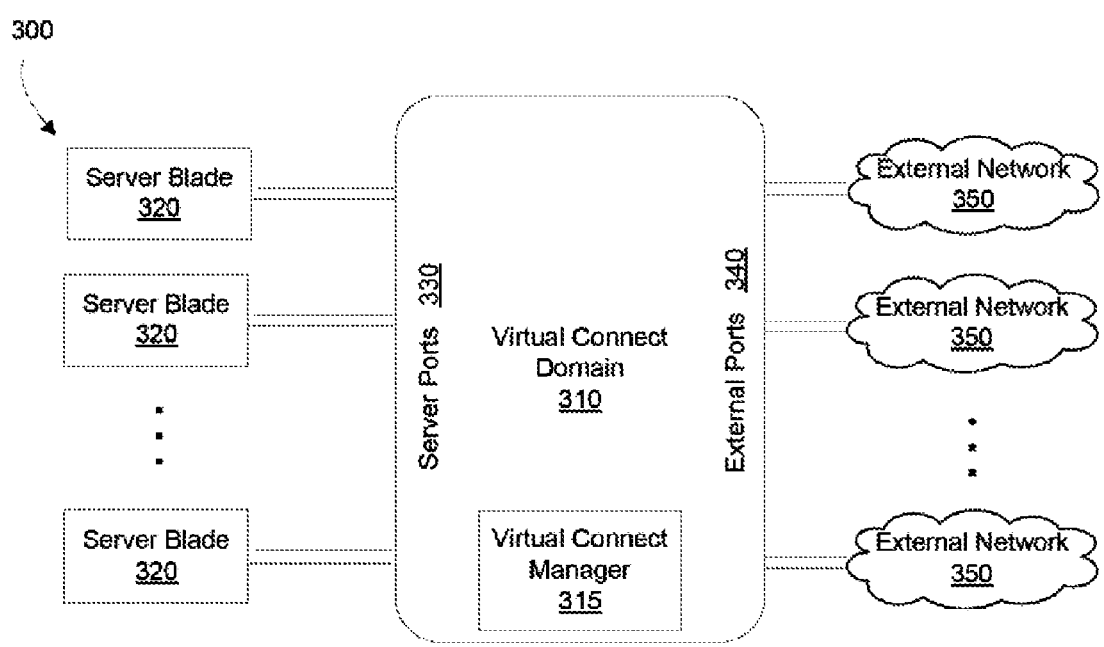
FIG. 3 is a diagram of an exemplary networked computer system using a virtual connect domain in accordance with an exemplary embodiment of the present invention.

FIG. 3 is a diagram of an exemplary networked computer system 300 using a Virtual Connect domain 310 having a closet manager 315 in accordance with an exemplary embodiment of the present invention. A plurality of servers or blades 320 connect to the Virtual Connect domain 310 at server ports 330. A plurality of external networks 350 connect to the Virtual Connect domain 310 at external ports 340.

In the computer system 300, network administrators are able to define the accessible external networks 350, and the server administrators utilize the Virtual Connect domain 310 to connect a server NIC port to a specific network 350. Server ports 330 are soft wired to the external ports 340 to enable flexibility in design and connectivity. Further, servers or blades 320 are on separate external networks cannot see each other.

As viewed from the external networks 350, the external ports 340 of the Virtual Connect domain 310 function as a server NIC port. As such, no network loops exist, and configurations support load balancing and fall-over.

The Virtual Connect domain 310 is connected to one or more external networks and multiple physical external ports can be grouped together into a single logical port that support load-balancing (such as link aggregate control protocol, LACP, and port aggregation protocol, PAgP) and/or fail-over. Further, multiple external networks can use the same (logical) external port. Here, each external network is identified with a VLAN ID, and VLAN tags are inserted by the wiring closet as packets exit the wiring closet.

In one embodiment, the Virtual Connect domain spans multiple enclosures with multiple input/output (I/O) blades. Each I/O blade uplink is either a closet "external port" connected to an external network or an intra-closet link (ICL) that connects enclosures together within the Virtual Connect domain.

With ICLs, the closet manager 315 automatically discovers the complete topology inside of the Virtual Connect domain 310. ICLs are teamed together or trunked for greater throughput within the closet. Further, the Virtual Connect domain 310 automatically discovers and uses redundant ICL paths for fail-over, reports failures in paths, and issues a warning to an administrator when there are no fall-over paths available.

The closet manager 315 enables an administrator to configure external networks, associate server ports with specific external networks, and identify ports that can be used as "external ports." Further, administrators are provided with recommendations on the best or most efficient pathways to interconnect I/O blades. The manager also provides a method to verify redundancy throughout the wiring closet and continually monitors status and health of wiring closet links. Using the closet manager 315, administrators can establish remote port mirroring in order to monitor any server port. Administrators are also able to monitor statistics associated with server ports, intra-closet links, and external network ports.

Figure 4A:
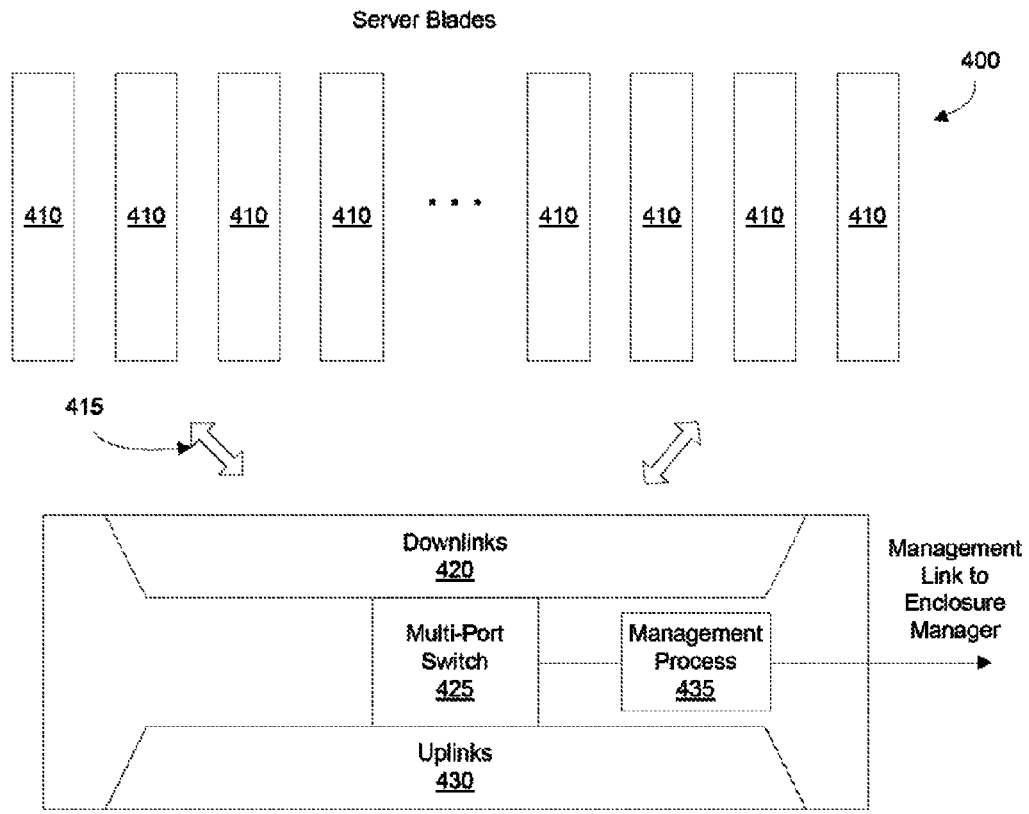
FIG. 4A is an example switch design in accordance with an exemplary embodiment of the present invention.

FIG. 4A is an example switch design 400 in accordance with an exemplary embodiment of the present invention. As shown, a plurality of servers or blades 410 connect or couple 415 (example, two transmit/receive lanes) to downlinks 420. The downlinks connect to a multi-port switch (example, a 24 port 10 GE switch) which connects to uplinks 430. The switch 425 connects to a management process 435 which provides a management link to the enclosure manager.

Figure 4B:
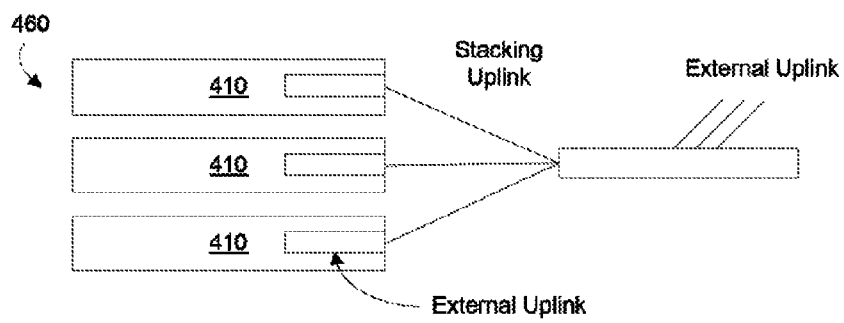
FIG. 4B is an example switch design showing server stacking in accordance with an exemplary embodiment of the present invention.

FIG. 4B is an example switch design 460 showing servers 410 stacked in accordance with an exemplary embodiment of the present invention. Stacking of the servers expands the soft wiring closet and includes both blade-based and separate rack-mount switches. The combination becomes the virtual soft wiring closet.

In one embodiment, the administrator selects ports anywhere in the soft wiring closet as external uplinks. The association of blade servers with external uplinks creates a soft network that is independent of VLAN tagging. In one embodiment, automatic discovery of the stacking configuration occurs.

In the soft wiring closet mode, servers are soft wired to uplinks and groups of servers are on separate networks. These servers cannot see each other. The soft wiring closet appears unmanaged to the external networking environment (i.e., no management packets are visible on the uplink wires, no standard switch MIBs are required, and each uplink is indistinguishable from a collection of hosts connected through an unmanaged switch). The soft wiring closet also includes one of more of the following: administrators define the networks, administrators configure which server blades/ports are connected to each network, administrators configure which uplink or uplinks (port trunking) are used for each network, administrators associate a tagged VLAN with a network, and various graphical views are presented (example, what ports are on each network and to which network is each server connected).

The virtualized data center fabric mode provides support for virtualization of network resources (example, similar to vFrame, egenera, etc.). This mode operates underneath a virtual server manager so networks and uplinks are pre-defined by the administrator. Further, server ports are mapped to specific networks when the server image is deployed. It still appears unmanaged to the external networking environment (example, no management packets visible o the uplink wires, no standard switch MIBs, and it looks like just a bunch of hosts from each uplink). Soft wiring closet views are available (showing net result of automatic deployment), and basic switch firmware is the same as the soft wiring closet.

One exemplary embodiment utilizes a discovery protocol to establish connectivity within a virtual connect domain. In order to simplify discussion and expound examples, the description uses an arbitrary term "Module" to describe some exemplary embodiments. A Module is a server/blade network interconnect method or strategy for convincing the external networking environment that it is just attached to a bunch of hosts. The embodiments of Module enable changes to blade system servers without disrupting LAN administrators and assist in simplifying movement of server configurations among physical server blades.

In order to further a discussion of exemplary embodiments, one or more of the following requirements are implemented:

(1) Modules in the same VirtualConnect domain are able to recognize one another.
(2) Modules are able to recognize switches that are not Modules (non-Module switches). Non-Module switches are excluded from the VirtualConnect domain.
(3) Modules configured to be in different VirtualConnect domains are able to recognize that their domains differ and exclude each other from their respective VirtualConnect domains.
(4) Modules report the results of the discovery process by means of the Module.
(5) Upon discovering that a remote node's identity or configuration as reported via LLDP is inconsistent with the stored information, (e. g., a device on an external port identifies itself as a Module in the same VirtualConnect domain, or a device on an internal port identifies itself as a non-Module switch), a Module inhibits normal traffic through the port and alerts the responsible management entity to the mis-configuration.

For discussion purposes, the exemplary embodiments discussed in connection with Modules concentrate on features of a specialized implementation of the Link Layer Discovery Protocol (LLDP). It is assumed that some (or several) other Module firmware component is responsible for controlling whether normal traffic is enabled on a port based on configuration and status according to the SMASH/CLP objects described in the following table.

| Managed element attribute values | Meaning | Normal traffic enabled? |
|---|---|---|
| /ports/portN [type] = "external"<br>/ports/portN [op_link_status] = "unlinked"<br>/ports/portN/remotedevice [type] = "unknown" | Nothing is connected | No |
| /ports/portN [type] = "external"<br>/ports/portN [op_link_status] = "unlinked"<br>/ports/portN/remotedevice [type] != "unknown" | Not valid | No |
| /ports/portN [type] = "external"<br>/ports/portN [op_link_status] = "linked"<br>/ports/portN/remotedevice [type] = "unknown" | The remote device does not send LLDPDUs, or discovery is still in progress | Yes |
| /ports/portN [type] = "external"<br>/ports/portN [op_link_status] = "linked"<br>/ports/portN/remotedevice [type] = "External Switch" | The remote device has been detected and identified | Yes |
| /ports/portN [type] = "external"<br>/ports/portN [op_link_status] = "linked"<br>/ports/portN/remotedevice [type] = "Domain Switch" | Not valid | No |
| /ports/portN [type] = "internal"<br>/ports/portN [op_link_status] = "unlinked"<br>/ports/portN/remotedevice [type] = "unknown" | Nothing is connected | No |
| /ports/portN [type] = "internal"<br>/ports/portN [op_link_status] = "unlinked"<br>/ports/portN/remotedevice [type] != "unknown" | Not valid | No |
| /ports/portN [type] = "internal"<br>/ports/portN [op_link_status] = "linked"<br>/ports/portN/remotedevice [type] = "unknown" | Discovery is still in progress | No |
| /ports/portN [type] = "internal"<br>/ports/portN [op_link_status] = "linked"<br>/ports/portN/remotedevice [type] = "External Switch" | The remote device has been detected and identified and is not a valid domain member | No |
| /ports/portN [type] = "internal"<br>/ports/portN [op_link_status] = "linked"<br>/ports/portN/remotedevice [type] = "Domain Switch" | The remote device has been detected and identified and is a valid Virtual Connect domain member | Yes |
| /ports/portN [type] = "server" | No Virtual Connect discovery | Yes |
| /ports/portN [type] = "unknown" | Port is not configured | No |

In one embodiment, different Allies components control the three attributes listed in the above-table.

The VirtualConnect Manager controls /ports/portN [type]. By default, server ports have type "server" and do not participate in Virtual Connect discovery, and the ports associated with inter-switch links have type "internal" and do participate in Virtual Connect discovery. The VirtualConnect Manager presumably will not change the type of a server port or a port associated with an inter-switch link. Further, /ports/portN [op_link_status] reflects the state of the link signal on the corresponding Ethernet interlace, and lldpd controls /ports/portN/remotedevice [type]. This is where the results of the discovery protocol are reflected. Further yet, one embodiment assumes the existence of a mechanism for delivering alerts to the VirtualConnect Manager or any other interested parties.

Figure 5:
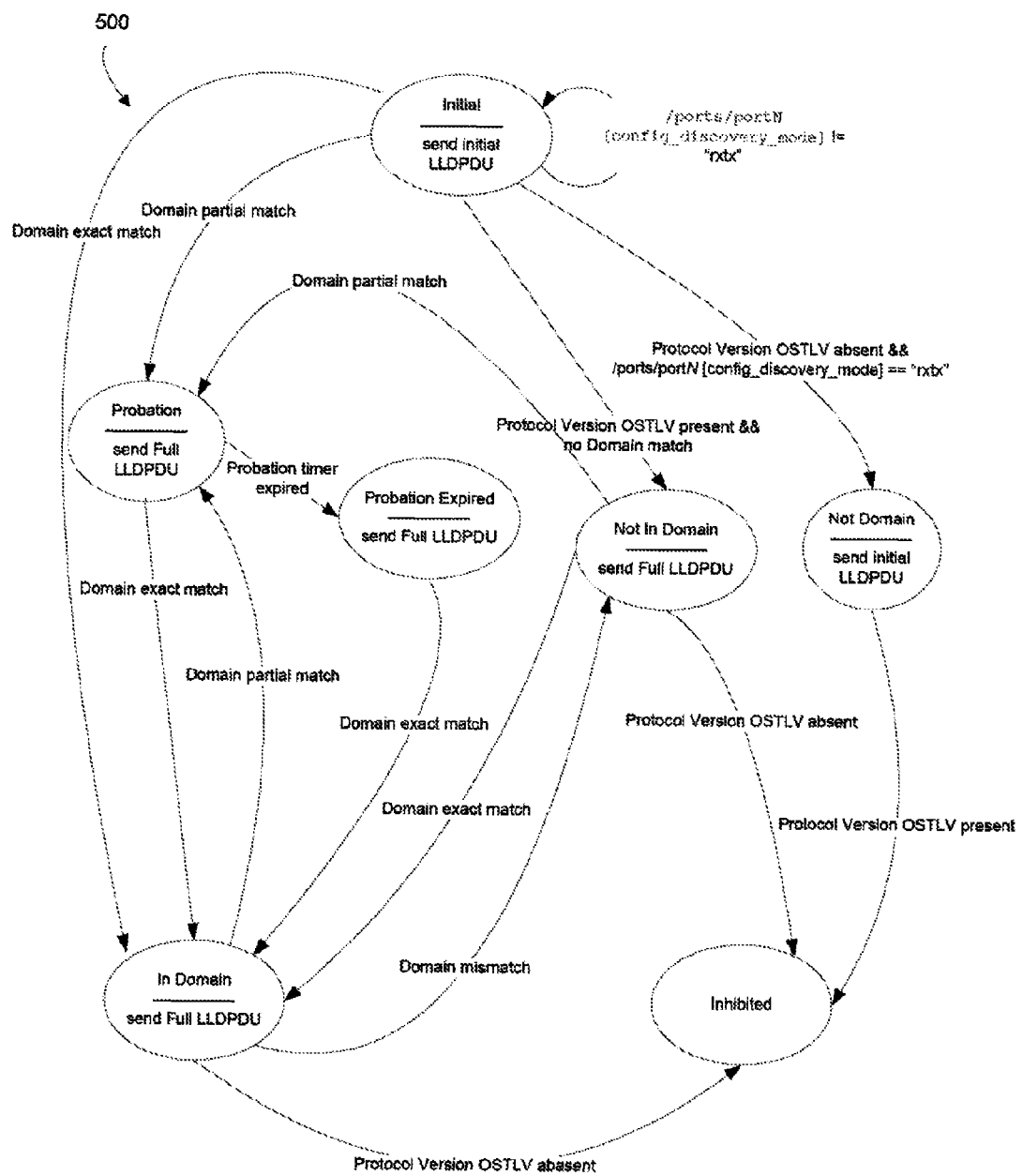
FIG. 5 illustrates a state machine that implements a discovery protocol in accordance with an exemplary embodiment of the present invention.

FIG. 5 illustrates the state machine 500 that implements the Virtual Connect discovery protocol on each port. To avoid clutter, two additional transitions are omitted from the diagram. Loss of link or expiration of the TTL of the most recently received LLDPDU results in a transition from any state to the Initial state; detection of loopback causes a transition from any state to the Inhibited state. The state machine interprets any received LLDPDU whose Chassis ID is identical to the Chassis ID TLV that it sends as an indication that a port is looped back. Note that this definition of loopback covers a cable linking two ports on the same device as well an an internal or external loopback on a single port.

For conciseness, two specific collections of TLVs are referred to by specific names. An LLDPDU containing, in addition to the standard TLVs, only a single Organizationally Specific TLV indicating a version of the Virtual Connect discovery protocol winch the sender implements, is referred to as an Initial LLDPDU. An LLDPDU containing all the OSTLVs comprising the Virtual Connect discovery protocol is referred to as a Full LLDPDU.

In the Initial state, the value of /ports/portN/remotedevice [type] is "unknown" and lldpd sends an Initial LLDPDU. Modules recognize each other by the receipt of an Initial LLDPDU.

If a Module receives an Initial LLDPDU, it transitions to the Not In Domain state. If a Module receives a Full LLDPDU containing values which agree with its own Virtual Connect domain configuration, it transitions directly to either the In Domain or the Probation state. In any case, a Module receiving an LLDPDU containing Virtual Connect TLVs immediately sends a Full LLDPDU without regard for the value of the msgTxInterval or txDelay timing parameters. This ensures that both Modules discover each other as rapidly as possible.

In one exemplary embodiment, Virtual Connect TLVs are considered to be in agreement if the following conditions hold:

The System Name TLVs of the two Modules match;
Both the local value of /ports/portN [type] and the Port Type TLV are "internal";
the Hash TLVs are valid, indicating that the /domain [credential] attributes match; and the Virtual Connect domain configuration generations of the two Modules differ by no more than the lesser of the two Modules' /domain [tolerance] attributes.

If the two Modules' configuration generations match exactly, the agreement is referred to as an exact match. If they differ but are within tolerance, the agreement is referred to as a partial match. Partial matches are discussed in more detail in the description of the Probation state below.

If a Module receives an LLDPDU that does not identify the sender as a Module, the state machine proceeds directly to the Not VC state. Normal traffic is permitted in the Initial state if and only if /ports/portN [type] is "external".

As a special case, if the LLDP discovery mode (/ports/portN [config_discovery_mode]) for a port is not set to "rxtx", the state machine remains in the Initial state.

In the Not VC state, the Module sets /ports/portN/remotedevice [type] to "External Switch". The state machine remains in the Not VC state until link is lost or an LLDPU is received which indicates that the sender is a Module. In the former case, the state machine transitions to the Initial state. In the latter, it transitions to the Inhibited state.

In the Not In Domain state, the Module sets /ports/portN/remotedevice [type] to "External Switch", even though the remote node is a Module. It continues sending Virtual Connect TLVs. The state machine remains in the Not In Domain state until link is lost or an LLDPU is received which indicates that the sender is a member of the same Virtual Connect domain as the receiver. In the former case, the State machine transitions to the Initial state. In the latter, it transitions to the In Domain state.

In the In Domain state, the Module sets /ports/portN/remotedevice [type] to "Domain Switch" and continues to send Virtual Connect TLVs. The state machine remains in the In Domain state until link is lost or an LLDPDU is received which is incompatible with the In Domain state. In the former case, the state machine transitions to the Initial state. The latter case has two subcases: if the TLVs no longer indicate that the sender is a Module, the state machine transitions to the Inhibited state; if the TLVs indicate that the two Modules are no longer members of the same Virtual Connect domain, the state machine transitions to the Not In Domain state.

The Probation state is entered upon receipt of an LLDPDU indicating Virtual Connect domain membership with a within-tolerance configuration generation mismatch. The Probation state is functionally identical to the In Domain state except that a probation timer is started on entry. If an LLDPDU indicating an exact match is received before the probation timer expires, the probation timer is canceled and the state machine transitions to the In Domain state. Otherwise, the state machine transitions to the Probation Expired state.

In the Probation Expired state, the port continues to exchange Virtual Connect LLDPDUs with its neighbor but labels the neighbor so as to prevent normal Virtual Connect operations between the two neighbors. The continued exchange of Virtual Connect LLDPDUs has two effects: first, it prevents thrashing by maintaining the two neighbors' understanding of each others' configurations; and second, it enables transition to the In Domain state as soon as the two neighbors's configurations become fully compatible as indicated by an exact match.

In the Inhibited state, no LLDPDUs are sent and incoming LLDPDUs are ignored. The only exit from the Inhibited state is to the Initial state due to loss of link or an administrative action which reinitializes the state machine.

In one exemplary embodiment, a Virtual Connect TLV is an OSTLV where the OUI is 00-14-C2. Several Virtual Connect TLVs are defined as described in the following table.

| 1. OSTLV name | 2. OSTLV subtype | 3. Datatype | 4. Description |
|---|---|---|---|
| 5. Virtual Connect discovery protocol version | 6. 1 | 7. uint8_t | 8. 1 for the protocol described in this document |
| 9. Domain config generation | 10. 2 | 11. uint32_t | 12. /domain [generation] |
| 13. Domain config generation tolerance | 14. 3 | 15. uint32_t | 16. /domain [tolerance] |
| 17. Domain config generation probation period | 18. 4 | 19. uint32_t | 20. /domain [probation] |
| 21. Enclosure id | 22. 5 | 23. UTF-8 string | 24. /[enclosure_id] |
| 25. Bay id | 26. 6 | 27. UTF-8 string | 28. /[bay_id] |
| 29. Port type | 30. 7 | 31. uint8_t | 32. Configured port type: 33. 0 = unknown 34. 1 = internal 35. 2 = external 36. 3 = server |
| 37. Hash | 38. 255 | 39. 21-octet binary string | 40. Hash subtype = 1 followed by SHA-1 hash of concatenation of the source MAC address, the TLV information strings of the System Name, Domain config generation, Enclosure id, and Bay id TLVs, and/domain [credential]. |

The following discussions ("Protocol Version TLV" through "Hash TLV") describe the Virtual Connect TLVs in detail.

Virtual Connect Protocol Version TLV: The Virtual Connect Protocol Version TLV indicates the version of the Virtual Connect Discovery Protocol that the sender is running. The protocol version described by this document is indicated by a value of 1. The format of the Virtual Connect Protocol Version TLV follows.

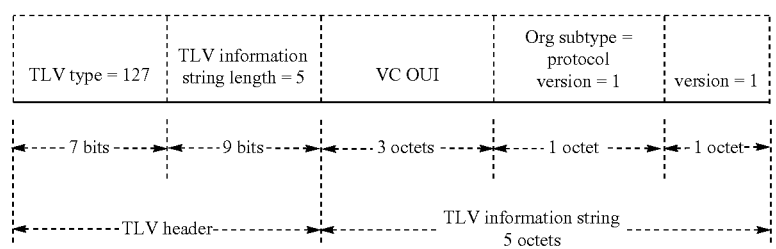

The Domain Configuration Generation TLV: The Domain Configuration Generation TLV conveys the generation number of the VirtualConnect configuration currently active on the sending Module. If the configuration generations of the two Moduless are identical and the System Name and credential match, the Modules consider each other full members of the same Virtual Connect domain.

The format of the Domain Configuration Generation TLV follows.

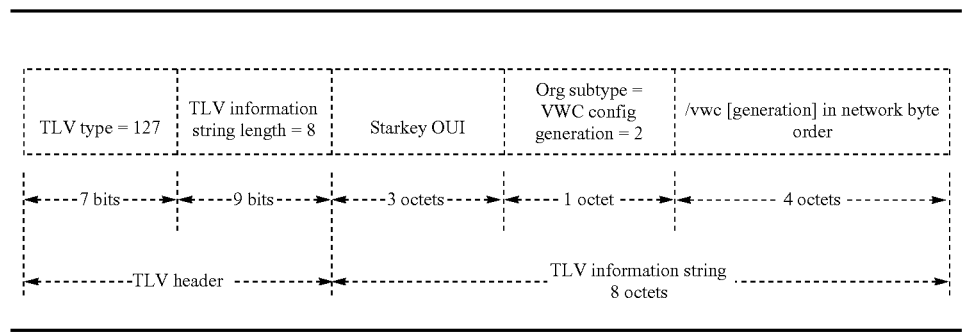

Domain Configuration Tolerance TLV: The Domain Configuration Tolerance TLV conveys the tolerance to configuration generation mismatches currently configured in /domain [tolerance] on the sending Module. When validating the configuration generation of a remote Module, the local Module uses the lesser of its own tolerance and that of the remote Module. If the configuration generations of the two Modules do not match, but the difference does not exceed the tolerance, the Modules consider each other probationary members of the same Virtual Connect domain. A tolerance of 0xffffffff is considered infinite, i. e., configuration generation checking is effectively disabled. A tolerance of 0 forces strict configuration generation matching.

The format of the Domain Configuration Tolerance TLV follows.

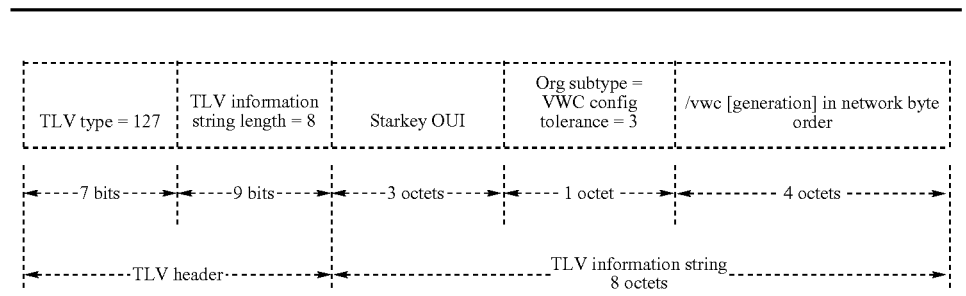

*If the difference between the two Starkeys'/vwc [generation]s exceeds this, /ports/portN [type] is set to "unknown". If the difference is less than the tolerance but non-zero, /ports/portN is set to "internal" and the probation timer is started. Each Starkey uses lesser of its own /vwc [tolerance] and the received VWC config tolerance.

Domain Probation TLV: The Domain Probation TLV conveys the length in seconds of the probationary period configured in /domain [probation] on the sending Module. When placing a remote Module on probation due to a configuration generation mismatch, the local Module sets a probation timer equal to the lesser of its own probationary period and that of the remote Module. If the probation timer expires before an LLDPDU containing a Domain Configuration Generation TLV matching the local value of /domain [generation] is received, the two Modules treat each other as if they had not been recognized as members of the same Virtual Connect domain. A probationary period of 0xffffffff is considered infinite, i. e., the two Modules whose configuration generations differ but match within the configured tolerance may continue operating normally indefinitely. A probationary period of 0 effectively forces strict configuration generation matching by terminating probation immediately.

The format of the Domain Probation TLV follows.

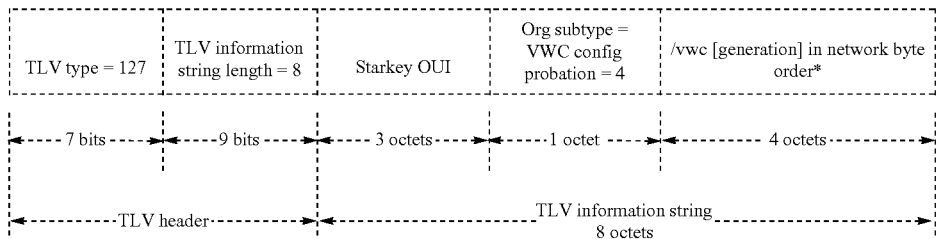

*After this many seconds with a generation mismatch, /ports/portN [type] reverts to "external". Each Module uses lesser of its own /vwc [probation] and the received VWC config probation to set the time limit.

Enclosure ID TLV: The Enclosure ID TLV uniquely identifies the enclosure in which the sending Module is installed. The format of the Enclosure ID TLV follows.

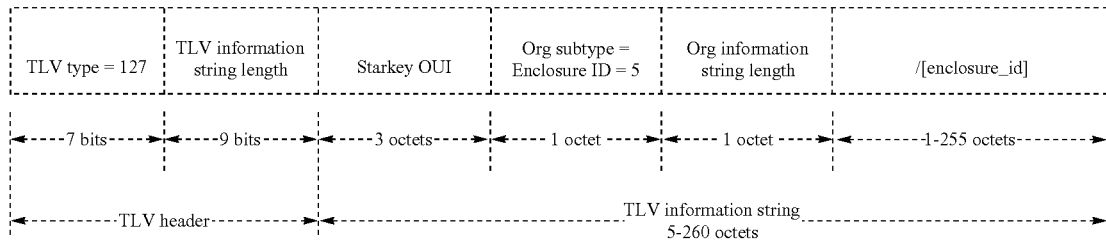

Bay ID TLV: The Bay ID TLV identifies the I/O bay in which the sending Module is installed. The format of the Bay ID TLV follows.

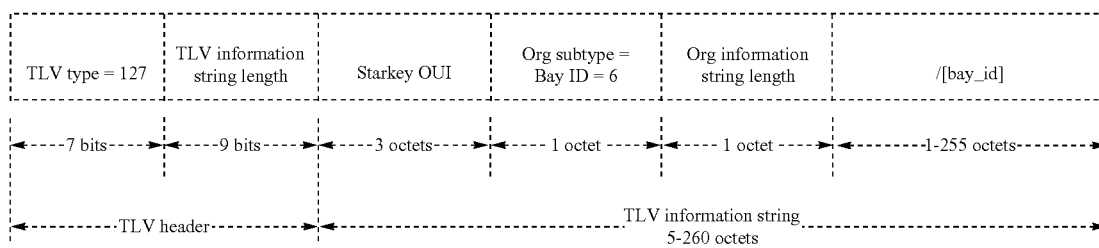

Port Type TLV: The Port Type TLV contains the configured type of the sending port.
Defined port type values are:
0=unknown
1=internal
2=external
3=server Hash TLV: The Hash TLV contains the SHA-1 hash of the concatenation of the following data items in the specified order:

1. The source MAC address of the sender.
2. The TLV information string from the System Name TLV.
3. The data field (/domain [generation]) from the Domain Configuration Generation TLV.
4. The data field (/[enclosure_id]) from the Enclosure ID TLV.
5. The data field (/[bay_id]) from the Bay ID TLV.
6. The Virtual Connect domain credential obtained from /domain [credential] and converted to a binary string.

The format of the Hash TLV follows.

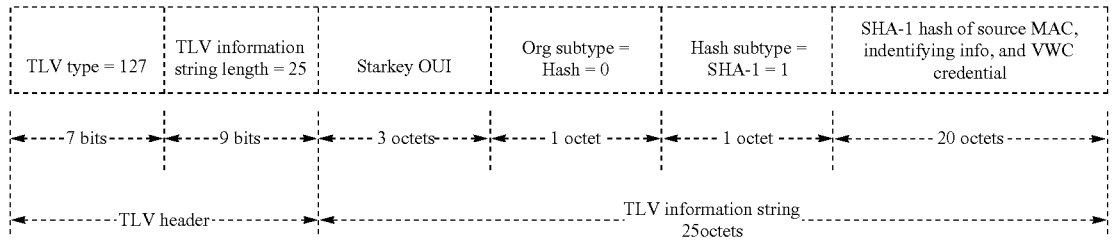

Discussion of protocol procedures: This section presents some scenarios of particular interest and shows how the Virtual Connect discovery protocol deals with them.

By default, the LLDP discovery mode (/ports/portN [config_discovery_mode]) for a port is "none" for server ports and "rxtx" for uplink ports. The protocol discussion that follows assumes the default discovery configuration. In rare cases, it may be desirable to configure the discovery mode to be "rx" or "tx" for uplink ports. In these cases, /ports/portN/remotedevice [type] will not be set to "Domain switch", even if a Module configured for the same Virtual Connect domain is detected.

Protocol Case 1: Two Modules in the same VirtualConnect domain discover each other at simultaneous initial power-on. Here, each Module sends an Initial LLDPDU in the Initial state. Upon receipt of an Initial LLDPDU, each state machine proceeds to the Not In Domain state and immediately sends a Full LLDPDU. Upon receipt of this Full LLDPDU, each Module computes the expected value of the Flash TLV based on the source MAC address of the LLDPDU and its own Virtual Connect domain credential. In this case, the expected and received hashes are identical, and the System Name TLV and Port Type TLV are compatible with an internal link, so the Moduless recognize each other as members of the same VirtualConnect domain.

At this point, each state machine enters the In Domain state and updates its CLP database, setting /ports/portN/remotedevice [type] to "Domain Switch".

Protocol Case 2: A Module joins an already-established VirtualConnect domain. Here, the newly started (or newly configured) Module sends an Initial LLDPDU in the Initial state. Upon receipt of the first Initial LLDPDU, the already-running Module immediately sends a Full LLDPDU and proceeds from the Initial to the Not In Domain state. The new Module recognizes the existing Module as a member of its VirtualConnect domain and proceeds to the In Domain state, sending a Full LLDPDU. The existing Module receives the latter LLDPDU, recognizes the new Module as a member of its VirtualConnect domain and proceeds to the In Domain state.

At this point, each state machine is in the In Domain state and has set the corresponding /ports/portN/remotedevice [type] to "Domain switch".

Protocol Case 3: Two Modules in different VirtualConnect domains discover each other. Here, each Module sends an Initial LLDPDU in the Initial state. Upon receipt of an Initial LLDPDU, each state machine proceeds to the Discovery state and immediately sends a Full LLDPDU. Upon receipt of this second LLDPDU, each Module computes the expected value of the Hash TLV based on the source MAC address of the LLDPDU and its own Virtual Connect domain credential.

The expected and received hashes may differ, so the Modules recognize each other as Modules that are members of different VirtualConnect domains. If the hashes match but the System Name TLVs do not, indicating that the two Modules belong to different domains to which the administrator has chosen to assign identical credentials, the Modules likewise recognize each other as Modules that are members of different VirtualConnect domains.

At this point, each state machine enters the Not In Domain state and updates its CLP database, setting /ports/portN/remotedevice [type] to "External Switch".

Protocol Case 4: A Module discovers a non-Module which implements LLDP. Here, the Module sends an Initial LLDPDU in the Initial state. Upon receipt of an LLDPDU which does not identify its sender as a Module (i. e. which is neither an Initial LLDPDU nor a Complete LLDPDU), the Module recognizes the remote device as a non-Module and consequently not a member of its VirtualConnect domain.

At this point, the state machine enters the Not VC state and updates its CLP database, setting /ports/portN/remotedevice [type] to "External Device", "External Switch", or "Unknown" depending on the capacity of its heuristics to identify the remote device from its TLVs.

Protocol Case 5: A Module discovers a non-Module which does not implement LLDP. Here, the Module sends an Initial LLDPU in the Initial state. Because no LLDPDU is received, the only indication of the presence of a remote device is a link indication on the port, indicated by the value "linked" for /ports/portN/ [link_stains]. The state machine remains in the Initial state.

Protocol Case 6: LLDP timeout. Here, if LLDP information for a remote device is removed due either to a timeout or to receipt of an LLDPDU with TTL set to 0, the corresponding information is removed from the CLP database, /ports/portN/remotedevice [type] is set to "unknown". The state machine proceeds to the Initial state. Future discovery remains enabled.

Figure 6:
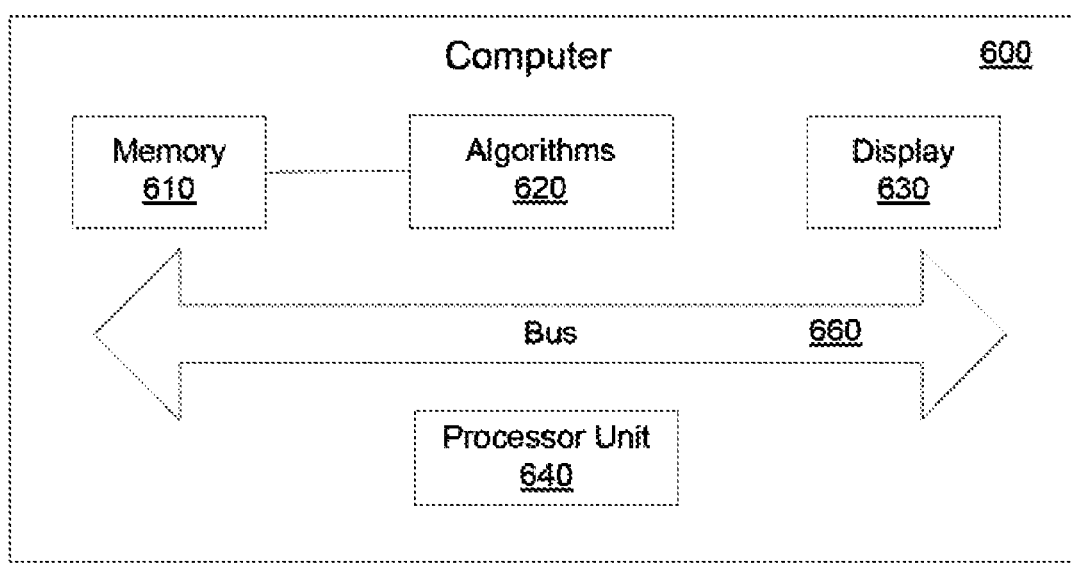
FIG. 6 is a block diagram of a computer in accordance with an exemplary embodiment of the present invention.

FIG. 6 is an exemplary computer 600 in accordance with an exemplary embodiment. In one embodiment, the computer includes memory 610, algorithms 620, display 630, processing unit 640 and one or more buses 650.

In one embodiment, the processor unit includes a processor (such as a central processing unit, CPU, microprocessor, application-specific integrated circuit (ASIC), etc.) for controlling the overall operation of memory 610 (such as random access memory (RAM) for temporary data storage, read only memory (ROM) for permanent data storage, and firmware). The memory 610, for example, stores applications, data, programs, algorithms (including software and/or firmware to implement or assist in implementing embodiments in accordance with the present invention) and other data. The processing unit 640 communicates with memory 610 and display 630 via one or more buses 650.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

As used herein, "spanning tree" or "spanning tree protocol" or "STP" is a network protocol that provides loop free topology for a bridge LAN. Spanning tree protocol prevents loops in switched networks by finding a spanning tree in a mesh network and disabling links not part of the discovered tree. Spanning trees can eliminate broadcast storms that otherwise occur when packets loop between switches. Generally, STP elects a root bridge, finds paths to the root bridge, determines the best path to the root bridge (i.e., calculates sums of traversed port costs), and disables all other root paths.

In STP, each switch has an ID and a priority number that form the bridge identification or BID. The BID determines the root bridge based on the lowest priority number. Once the root bridge is determined, other network switches calculate the shortest path to the same root bridge and thus produce a loop free topology even though multiple paths to the root bridge exist. The BID and other information is carried in data frames called bridge protocol data units (BPDUs) that enable switches to track network changes, activate ports, disable ports, etc. When a device is attached to a switch port, the device transitions through various states processing BPDUs and determining the topology of the network. Generally, STP switch ports support listening, learning, blocking, forwarding, and disabling.

As used herein, "rapid spanning tree protocol" or "RSTP" is a variation of STP that improves spanning tree convergence after a topology change. RSTP detects root switch failures more quickly than STP, configures ports as edge ports if attached to a LAN with no other bridges, and responds to BPDUs sent from the direction of the root bridge.

As used herein, "multiple spanning free protocol" or "MSTP" is a variation of RSTP used with VLANs and configures a separate spanning tree for each VLAN group and blocks links that are redundant within each spanning tree. Thus, MSTP works in networks with multiple virtual LANs and enables formation of MST regions running multiple MST instances.

As used herein, a "virtual LAN" or "VLAN" includes independent logical networks within a physical network. Each physical network can include multiple VLANs that co-exist as separated logical segments of the LAN. Networked computers in a VLAN function as if connected to the same wire even though they are physically connected to different segments (i.e., portion of computer network wherein each device communicates using a same physical layer) of a LAN. Network administrators configure the VLAN through software.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such oilier systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for discovering connectivity between devices in a virtual local area network (VLAN), comprising:
    receiving a unique identifier from a device in the VLAN;
    determining if the unique identifier is from a virtual connect (VC) module;
    identifying a link to the device as being a potential internal link in the VLAN when the unique identifier is from the VC module and as being an external link in the VLAN when the unique identifier is not from the VC module;
    wherein when the link to the device is identified as an external link, the link to the device is labeled as an external link;
    wherein when the link to the device is identified as a potential internal link, determining if a domain credential of the device matches a shared secret and labeling the link to the device as an internal link if the domain credential of the device matches the shared secret and as an external link if the domain credential of the device does not match the shared secret.

2. The method of claim 1, wherein the unique identifier includes a virtual local land area network identification (VLAN ID).

3. The method of claim 1, wherein the VC module is a set of interconnect modules and embedded software for a blade enclosure in a datacenter.

4. The method of claim 1 further comprising, determining a domain of the device from a type-length-value (TLV) when the link to the device is identified as a potential internal link.

5. The method of claim 1 further comprising: receiving the unique identifier at a second device; sending a type-length-value (TLV) from the second device to the device; determining if a system name of TLVs at the device and the second device match.

6. A non-transitory computer readable medium having instructions for causing a computer to execute a method, comprising:
- receiving at a first device information from a second device in a virtual local land area network (VLAN);
- determining if the information from the second device matches a configuration of a virtual connect domain (VCD);
- identifying a link between the first and second device as being a potential internal link in the VLAN when the information matches the VCD and as being an external link in the VLAN when information does not match the VCD;
- wherein when the link between the first and second device is identified as an external link, the link between the first and second device is labeled as an external link;
- wherein when the link between the first and second device is identified as a potential internal link, determining if a domain credential of the device matches a shared secret and labeling the link between the first and second device as an internal link if the domain credential of the device matches the shared secret and as an external link if the domain credential of the device does not match the shared secret.

7. The non-transitory computer readable medium of claim 6 further comprising, sending from the first device to the second device a link layer discovery protocol (LLDP) that contains type-length-values (TLVs).

8. The non-transitory computer readable medium of claim 6 wherein the step of determining if the information from the second device matches the configuration of a virtual connect domain (VCD) further comprises comparing a VCD configuration of the first device with a VCD configuration of the second device to determine if a difference exists within a predetermined tolerance or an exact match exists.

9. The non-transitory computer readable medium of claim 6 wherein the step of determining if the information from the second device matches the configuration of a virtual connect domain (VCD) further comprises determining if a system name of type-length-values (TLVs) of the first and second devices match.

10. The non-transitory computer readable medium of claim 6 wherein the step of determining if the information from the second device matches the configuration of a virtual connect domain (VCD) further comprises determining if hash values of type-length-values (TLVs) of the first and second devices match.

11. The non-transitory computer readable medium of claim 6 wherein the step of determining if the information from the second device matches the configuration of a virtual connect domain (VCD) further comprises determining if the first and second devices are members of the VCD.

12. The non-transitory computer readable medium of claim 6 further comprising, labeling the second device as the internal link until either a link with the second device is lost or the first device receives a link layer discovery protocol data unit (LLDPDU) that is incompatible with the configuration of the VCD.

13. The non-transitory computer readable medium of claim 6 further comprising, transitioning to an inhibiting state when the first and second devices are no longer members of the VCD.

14. A method for discovering connectivity between devices in a network, comprising:
- determining if information received from a device in a virtual local land area network (VLAN) matches a configuration of a virtual connect domain (VCD);
- identifying a link to the device as being a potential internal link in the VLAN when the information matches the VCD and as being an external link in the VLAN when information does not match the configuration of the VCD;
- wherein when the link to the device is identified as an external link, the link to the device is labeled as an external link;
- wherein when the link to the device is identified as a potential internal link, determining if a domain credential of the device matches a shared secret and labeling the link to the device as an internal link if the domain credential of the device matches the shared secret and as an external link if the domain credential of the device does not match the shared secret.

15. The method of claim 14 further comprising, continuing to label the device as having the internal link until the device sends a link layer discovery protocol data unit (LLDPDU) that does not match the configuration of the VCD.

16. The method of claim 14 further comprising, ignoring link layer discovery protocol data units (LLDPDUs) from the device when the link to the device is labeled as an external link.

17. The method of claim 14 further comprising:
- using link layer discovery protocol (LLDP) to determine boundaries of the VLAN;
- activating LLDP extensions to enable devices to discover a topology of the VLAN.

18. The method of claim 14 further comprising, monitoring traffic at a boundary of an external network to the VLAN to identify ports connected to the external network.

19. A method for discovering connectivity between devices in a network, comprising:
- determining if information received from a device in a virtual local area network (VLAN) matches a configuration of a virtual connect domain (VCD);
- labeling a link to the device as being an internal link in the VLAN when the information matches the VCD and as being an external link in the VLAN when information does not match the configuration of the VCD; and
- entering a probation state upon receiving a link layer discovery protocol data unit (LLDPDU) that indicates membership in the VCD but also indicates a tolerance configuration mismatch with the configuration of the VCD.

* * * * *